Dec. 11, 1923.

H. A. CARTWRIGHT

DIFFERENTIAL GEARING

Original Filed March 1, 1920  2 Sheets-Sheet 1

1,477,310

Witness:

INVENTOR
Horace A. Cartwright,
BY
ATTORNEY

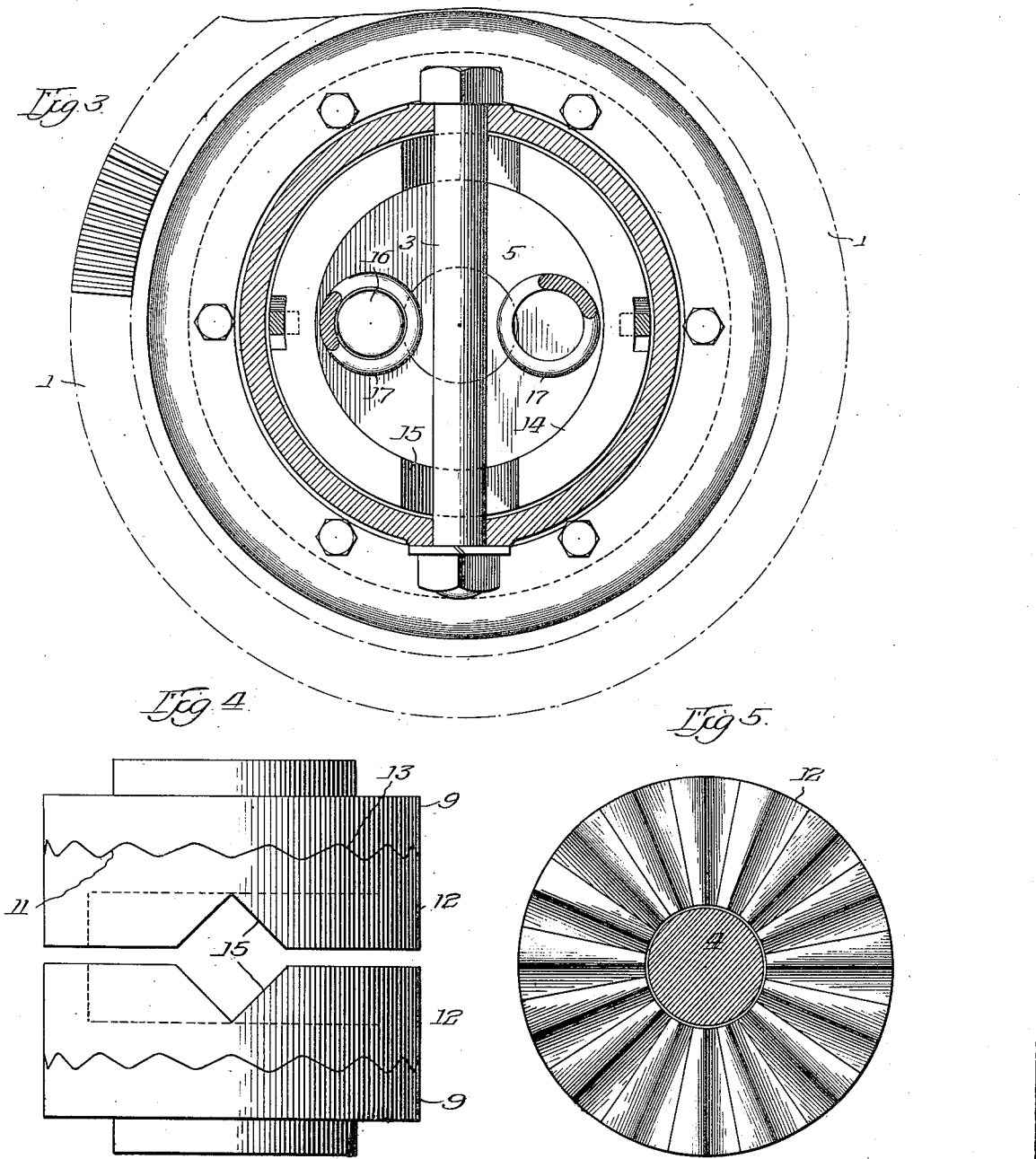

Patented Dec. 11, 1923.

1,477,310

UNITED STATES PATENT OFFICE.

HORACE A. CARTWRIGHT, OF AKRON, OHIO.

DIFFERENTIAL GEARING.

Application filed March 1, 1920, Serial No. 362,479. Renewed May 17, 1923. Serial No. 598,777.

*To all whom it may concern:*

Be it known that I, HORACE A. CARTWRIGHT, a citizen of the United States, residing at Akron, in the county of Summit, State of Ohio, have invented certain new and useful Improvements in Differential Gearing, of which the following is a specification.

This invention relates to driving mechanisms for use particularly in automobile construction and its purpose is to provide a differential which may be substituted for the differentials at present in use. The object of the invention is to construct a differential which is not provided with gears, the relative movement of the two halves of the differential being permitted by means of certain combination of parts as will be described in the body of the specification.

Objects and advantages will be apparent as the description proceeds, it being understood that the present showing of the invention is only one of the forms in which it may be incorporated, being capable of embodiment in other modifications, and such modifications are intended to be covered herein.

In the drawings:

Fig. 3 is a section on the line 3—3 of Fig. 1.

Fig. 4 is a side elevation of the shiftable clutch member of the differential.

Fig. 5 is a face view of one of the clutch members.

Figure 1:
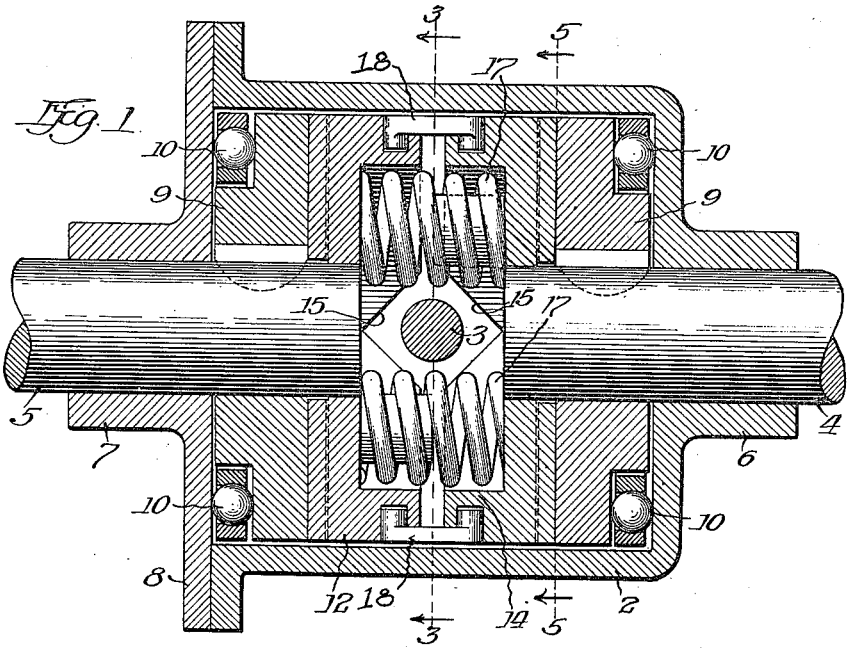
Fig. 1 is a longitudinal section through the differential.
Figure 2:
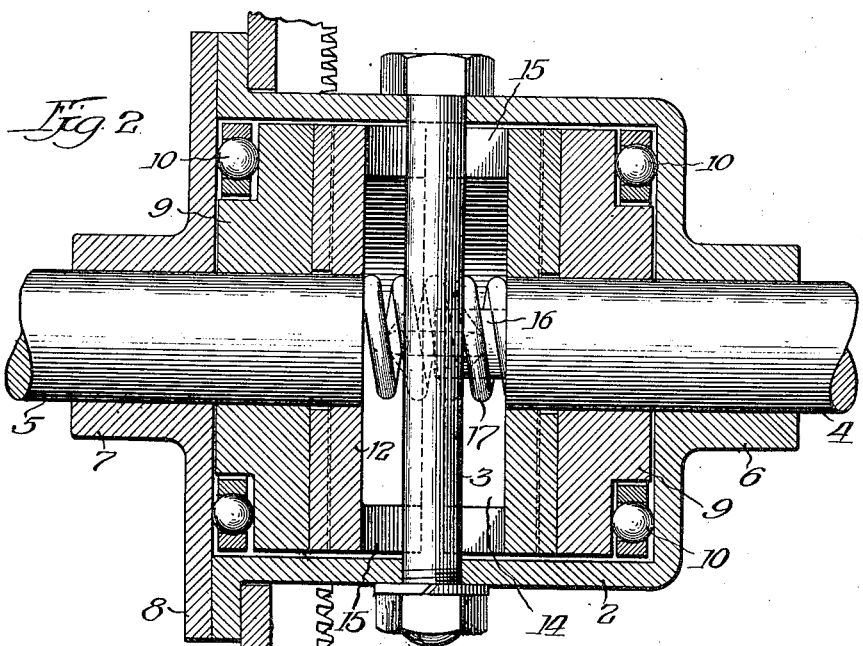
Fig. 2 is a longitudinal section in a plane at right angles to the plane of Fig. 1.

In the form of the invention shown in the drawings power for driving the differential is transmitted in any preferred manner, the specific form shown herein comprising a driving pinion 1 secured on the outside of a rotatable casing or housing 2. At a convenient point in the housing is secured a driving member, here shown as a shaft or bolt 3 extending across the housing and secured in any preferred manner.

The rear axle of the machine is shown in its two parts 4 and 5, right and left, respectively, which are rotatably mounted in a bearing 6 in the housing and a bearing 7 in a plate 8 closing the side of the housing. Near the end of each portion of the rear axle is secured a disk 9 spaced from the side of the housing or casing by ball bearing 10 and provided on its inner face with a corrugated, undulatory or wavy clutch surface 11, the contour of which is shown in Figs. 4 and 5. The clutch surface may be of any form by which an efficient driving torque may be transmitted, but which will allow slipping under certain conditions, as will be understood as the description proceeds. It will be seen that owing to the contour of the surface 11, the clutch face may slip without being entirely disengaged from driving relation.

On the inner facing ends of the shafts 4 and 5 are loosely mounted disks or clutches 12, the surfaces of which are provided with irregular surfaces 13 to mate with the irregular surfaces on the inner faces of the disks 9. Each disk 12 is provided with an annular flange 14, the flange extending beyond the ends of the shafts 4 and 5 and approaching each other but separated sufficiently to permit one of the movable and rotatable disks 12 to withdraw from the face of the disk 9. In the flanges 14 are provided facing V-shaped notches 15, diametrically opposite and into the square recess formed by the notches is received the driving pin 3.

On the inner face of each movable disk 12 is formed a pin or stud 16 the studs being placed oppositely when the parts are assembled, as shown in Fig. 1. On each stud is seated a coil spring 17, which together yieldingly maintain the movable disks separated and their respective clutch faces in engagement. By the arrangement shown, the springs are kept properly spaced, but relative turning movement of the two disks is permitted.

Between the two movable disks 12 is arranged a pair of hinges or staples 18 which normally lock the two parts of the differential together for driving, but which serve to draw the two movable disks 12 together when one shaft is traveling faster than the other in the manner to be explained.

The operation of the device may be summarized briefly as follows: Driving impulse is transmitted to the differential through the pinion 1 and casing 2, which in turn rotates the two portions of the differential through the pin 3 which rests within the apices of the recesses 15. During straight-away driving the movable portions of the clutch members remain in full locking relation as shown in the drawings. If, now, one of the wheels connected to either shaft 4 or 5 is compelled to go faster than the other in rounding a corner, the faster rotation of the clutch member 9 will cause that member to advance slightly over the movable member 12, the springs 17 permitting the member 12 to approach toward the center of the differential. If the turning movement of the vehicle is continued through a longer or sharper arc, the further movement of the relatively stationary portion 12 will force the movable clutch member further toward the center of the differential. The hinge 18 will cause the movable clutch member to be drawn over toward the pin releasing the two clutch members so that the wheel traveling the longer arc is free to turn independently of the other. The construction of the lugs 16 as shown in the drawings permits the disks to move relatively to each other while maintaining the springs in position, yet allowing them to slip over the faces of the clutch members 12.

It will be seen that there has been devised here a differential mechanism which may be termed gearless as it transmits power through the driving member comprising the gear and housing to the two driven members or halves of the rear axle while permitting one of the wheels to rotate faster than the other. Thus is furnished a simple and inexpensive mechanism which is effective in operation.

While the description has been somewhat detailed, it will be understood that the details are not essential to the invention and may be omitted or modified as desired without sacrificing any of the broad features of the invention.

I claim:

1. A differential comprising a two part rear axle, a clutch member secured to each portion of said axle, a second clutch member mating with each first said clutch members, a housing for said clutch members means to rotate the housing, a pin traversing said housing, inclined surfaces on said second clutch members contacting with said pin, and yielding means to hold the respective clutch members in engagement.

2. A differential comprising a two part rear axle, a clutch member secured to each portion of said axle, a second clutch member mating with each first said clutch member, a housing surrounding the said clutch members, means to rotate the housing, a pin traversing said housing, oppositely facing V-shaped recesses on said second clutch members through which the pin passes, hinged connection between the second clutch members, and yielding means to hold the respective clutch members in engagement.

3. A differential comprising a two part axle, a clutch member in driving relation to each portion of said axle, a second clutch member mating with each aforementioned clutch member, means to drive the second clutch members, means to yieldingly hold said second named clutch members apart, and means to positively draw said second named clutch members together when the two parts of the rear axle are differentially rotated, said mating clutches having undulatory engaging faces whereby they may be partially withdrawn without destroying their driving relation.

HORACE A. CARTWRIGHT.